(12) United States Patent
Egashira

(10) Patent No.: US 10,330,036 B2
(45) Date of Patent: Jun. 25, 2019

(54) CONTROL APPARATUS

(71) Applicant: HONDA MOTOR CO., LTD., Tokyo (JP)

(72) Inventor: Fumio Egashira, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 54 days.

(21) Appl. No.: 15/851,433

(22) Filed: Dec. 21, 2017

(65) Prior Publication Data
US 2018/0202378 A1    Jul. 19, 2018

(30) Foreign Application Priority Data

Jan. 13, 2017 (JP) .................. 2017-004577

(51) Int. Cl.
| | | |
|---|---|---|
| *F16H 63/50* | (2006.01) | |
| *F02D 41/00* | (2006.01) | |
| *F02D 41/02* | (2006.01) | |

(52) U.S. Cl.
CPC ..... *F02D 41/0087* (2013.01); *F02D 41/0215* (2013.01); *F02D 41/0225* (2013.01); *F16H 63/50* (2013.01); *F02D 2200/101* (2013.01)

(58) Field of Classification Search
CPC ................ F02D 41/0087; F02D 41/0215
See application file for complete search history.

(56) References Cited

U.S. PATENT DOCUMENTS

| | | | |
|---|---|---|---|
| 5,295,415 A | 3/1994 | Abe et al. | |
| 5,433,676 A | 7/1995 | Abe et al. | |
| 7,591,130 B2* | 9/2009 | Ito | B60W 10/06 60/274 |
| 2009/0301451 A1* | 12/2009 | Ito | B60W 10/06 123/674 |

FOREIGN PATENT DOCUMENTS

JP    H5-1582 A    1/1993

* cited by examiner

*Primary Examiner* — Derek D Knight
(74) *Attorney, Agent, or Firm* — Thomas | Horstemeyer, LLP

(57) ABSTRACT

If the rotation speed of the output shaft of an engine exceeds a lower limit engine rotation speed, and the rotation speed of an input shaft exceeds a lower limit input shaft rotation speed, the control apparatus of this invention executes cylinder deactivation control of decreasing the number of operating cylinders by stopping the operations of some of a plurality of cylinders based on a cylinder deactivation upper limit engine torque set by referring to a cylinder deactivation control table corresponding to the gear range of an automatic transmission.

4 Claims, 11 Drawing Sheets

FIG. 2A

|  | C1 | C2 | C3 | B1 | B2 | B3 | F1 | GEAR RATIO |
|---|---|---|---|---|---|---|---|---|
| RVS |  |  | O |  | O |  | O | 4.008 |
| 1st |  |  |  | O | O | (O) | △/O | 5.233 |
| 2nd |  | O |  | O | O |  | (△) | 3.367 |
| 3rd |  |  | O | O | O |  | (△) | 2.298 |
| 4th |  | O | O | O |  |  | (△) | 1.705 |
| 5th | O |  | O | O |  |  | (△) | 1.363 |
| 6th | O | O | O |  |  |  | (△) | 1.000 |
| 7th | O |  | O |  | O |  | (△) | 0.786 |
| 8th | O | O |  |  | O |  | (△) | 0.657 |
| 9th | O |  |  |  | O | O | (△) | 0.584 |
| 10th | O | O |  |  |  | O | (△) | 0.520 |
| P/N |  |  |  |  |  |  | △/O | — |
| RPM | O |  | O |  |  | O | △→O | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

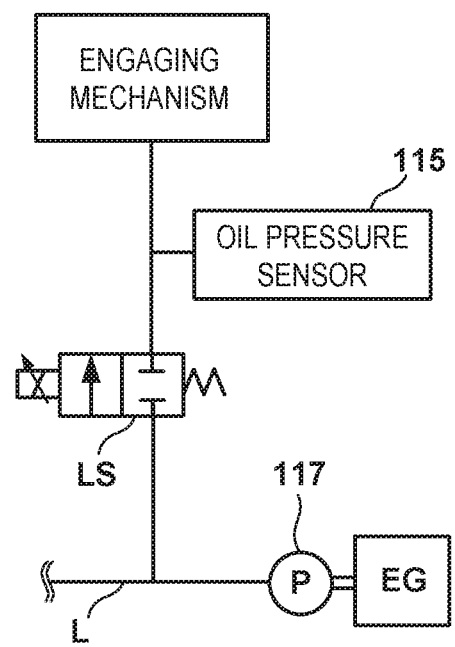
F I G. 4B

FIG. 5

| STEP | ENGAGING OPERATION | | | | | | | SHIFT CONDITION |
|---|---|---|---|---|---|---|---|---|
| | B3 | B2 | B1 | C3 | C2 | C1 | F1 | |
| 1 | — | ↓ | ↓ | — | — | — | △ | COMPLETION OF RELEASE |
| 2 | ○ | — | — | ○ | — | ○ | △ | INPUT ROTATION SPEED ≒ 0 COMPLETION OF ENGAGEMENT OF C1 ETC. |
| 3 | ○ | — | — | ○ | — | ○ | ○ | COMPLETION OF SWITCHING OF F1 |
| 4 | ↓ | ○ | — | ○ | — | ↓ | ○ | |

↓ : RELEASING

○ : ENGAGE

— : RELEASE

F1/△ : ONE-WAY ROTATION PERMISSION

F1/○ : ROTATION INHIBITION

| GEAR RANGE | ROTATION SPEED |
|---|---|
| 1 | NM1 |
| 2 | NM2 |
| 3 | NM3 |
| 4 | NM4 |
| 5 | NM5 |
| 6 | NM6 |
| 7 | NM7 |
| 8 | NM8 |
| 9 | NM9 |
| 10 | NM10 |

| CYLINDER DEACTIVATION UPPER LIMIT ENGINE TORQUE | | INPUT SHAFT ROTATION SPEED (NM) | | |
|---|---|---|---|---|
| | | N0 | N1 | N2 |
| ENGINE ROTATION SPEED (NE) | N1 | T1 | T4 | |
| | N2 | T2 | T5 | T5 |
| | N3 | T3 | T6 | T6 |

| | | CYLINDER DEACTIVATION UPPER LIMIT ENGINE TORQUE |
|---|---|---|
| ENGINE ROTATION SPEED (NE) | N1 | T1 |
| | N2 | T2 |
| | N3 | T3 |

FIG. 11B

| | | CYLINDER DEACTIVATION UPPER LIMIT ENGINE TORQUE |
|---|---|---|
| ENGINE ROTATION SPEED (NE) | N1 | T4 |
| | N2 | T5 |
| | N3 | T6 |

CONTROL APPARATUS

CROSS-REFERENCE TO RELATED APPLICATION

This application claims the benefit of Japanese Patent Application No. 2017-004577, filed Jan. 13, 2017, which is hereby incorporated by reference herein in its entirety.

BACKGROUND OF THE INVENTION

Field of the Invention

The present invention relates to a control apparatus that controls an internal combustion engine and an automatic transmission.

Description of the Related Art

Japanese Patent Laid-Open No. 5-1582 discloses an arrangement that switches fuel cut control for four cylinders to fuel cut for two cylinders when a turbine rotation speed lowers to a predetermined rotation speed.

In the technology disclosed in Japanese Patent Laid-Open No. 5-1582, the condition of main shaft rotation of an automatic transmission that greatly affects NV (noise and vibration) performance, that is, vibration sound and vibration damping performance is not taken into consideration. For this reason, even under a condition that allows execution of cylinder deactivation, it is determined that cylinder deactivation is inexecutable, and fuel consumption improvement is limited.

The present invention provides a control apparatus capable of determining, based on the condition of the rotation speed (engine rotation speed) of the output shaft of an internal combustion engine and the condition of the rotation speed of the input shaft of an automatic transmission, whether cylinder deactivation is executable and performing cylinder deactivation control.

SUMMARY OF THE INVENTION

According to one aspect of the present invention, there is provided a control apparatus including an engine control unit configured to control an engine including a plurality of cylinders, and a transmission control unit configured to control an automatic transmission including a torque converter with a lock-up clutch capable of connecting an output shaft of the engine and an input shaft of the automatic transmission, wherein the engine control unit comprises: an engine rotation speed determination unit configured to determine, based on a detection result of an engine rotation speed detection unit configured to detect a rotation speed of the output shaft of the engine, whether the rotation speed of the output shaft of the engine exceeds a lower limit engine rotation speed; and an engine storage unit configured to store, for each gear range of the automatic transmission, a cylinder deactivation control table that sets a cylinder deactivation upper limit engine torque determined based on the rotation speed of the output shaft of the engine and a rotation speed of the input shaft of the automatic transmission, the transmission control unit comprises an input shaft rotation speed determination unit configured to determine, based on a detection result of an input shaft rotation speed detection unit configured to detect the rotation speed of the input shaft of the automatic transmission, whether the rotation speed of the input shaft exceeds a lower limit input shaft rotation speed corresponding to a gear range of the automatic transmission, and if the rotation speed of the output shaft of the engine exceeds the lower limit engine rotation speed, and the rotation speed of the input shaft exceeds the lower limit input shaft rotation speed, the engine control unit executes cylinder deactivation control of decreasing the number of operating cylinders by stopping operations of some of the plurality of cylinders based on the cylinder deactivation upper limit engine torque set by referring to the cylinder deactivation control table corresponding to the gear range of the automatic transmission.

According to the present invention, it is possible to determine, based on the condition of the rotation speed of the output shaft of an engine and the condition of the rotation speed of the input shaft of an automatic transmission, whether cylinder deactivation is executable and perform cylinder deactivation control.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 4B is a view showing an example of the arrangement of an oil pressure sensor;

FIG. 5 is a view for explaining the outline of processing performed when the reverse range is selected;

FIG. 10 is a view exemplarily showing a cylinder deactivation control table that sets an upper limit engine torque determined based on an engine rotation speed and an input shaft rotation speed;

FIG. 11A is a view showing the set values of the upper limit engine torque that permits cylinder deactivation in correspondence with a predetermined input shaft rotation speed; and FIG. 11B is a view showing the set values of the upper limit engine torque that permits cylinder deactivation in correspondence with an input shaft rotation speed higher than a lower limit input shaft rotation speed.

DESCRIPTION OF THE EMBODIMENTS

Figure 1:
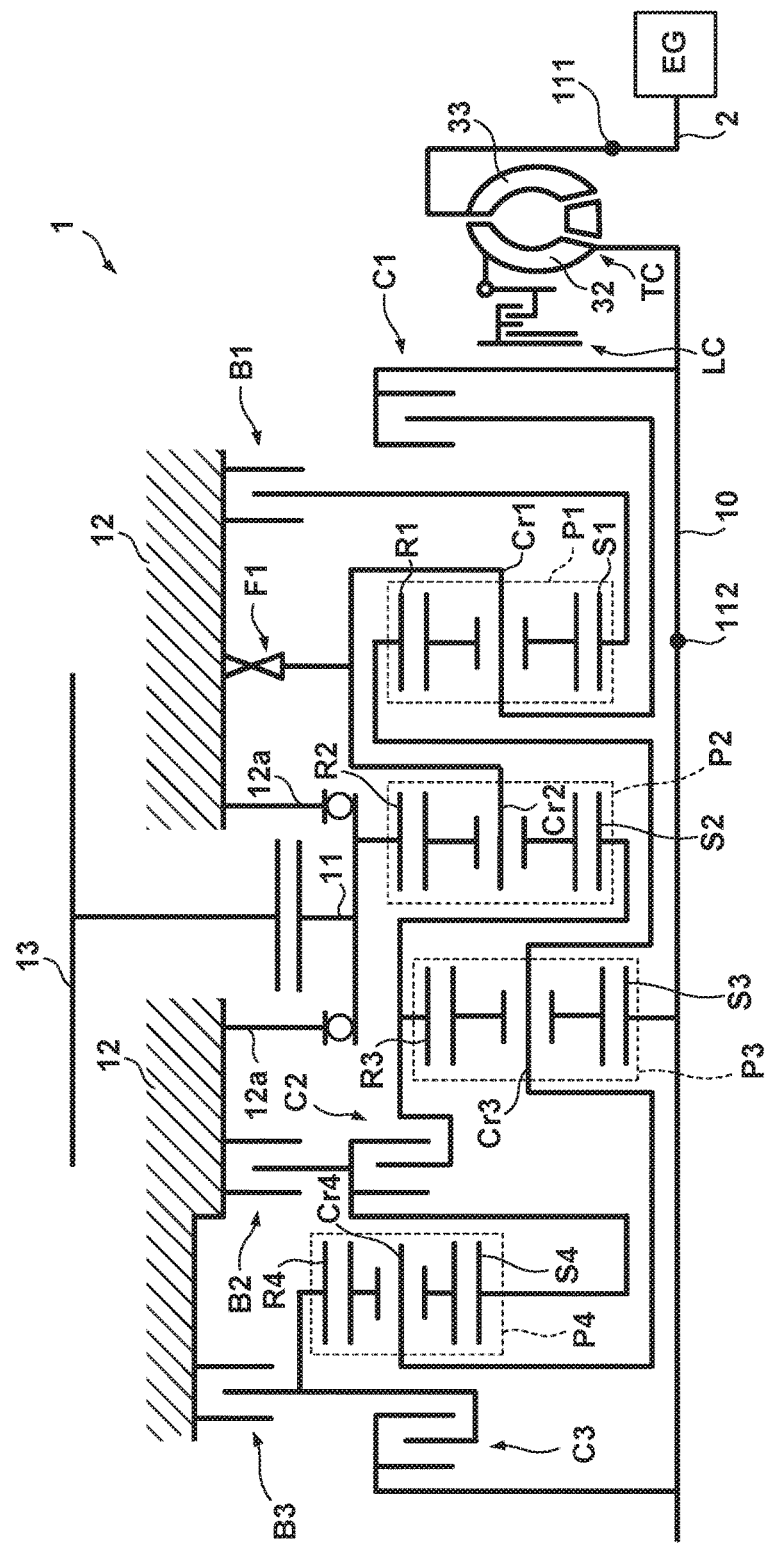
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 via the torque converter TC. The internal combustion engine EG is formed as, for example, a cylinder injection engine including a plurality of cylinders. An ignition plug and an electromagnetic fuel injection valve (fuel supply unit) (neither are shown) are attached to the cylinder head of the internal combustion engine EG on a cylinder basis. A high pressure fuel supplied from the fuel pump is injected from the fuel injection valve to the combustion chamber of each cylinder.

The output member 11 includes a gear concentric to the input shaft 10. The output shaft 13 includes a gear that meshes with the gear. The rotation of the input shaft 10 changes its speed via transmission mechanisms to be described below and is then transmitted to the output shaft 13. The rotation (driving force) of the output shaft 13 is transmitted to driving wheels via, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order. Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1. The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that transmits an input rotation to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the engaging mechanism F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the engaging mechanism F1 is switched from the one-way rotation permission state to the rotation inhibition state.

In the example of the engaging table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the engaging mechanism F1, "○" indicates the rotation inhibition state, and "Δ" indicates the one-way rotation permission state. In the first range (1st), the engaging mechanism F1 can be set in either the rotation inhibition state or the one-way rotation permission state. In the rotation inhibition state, the engine brake is enabled. In the first range, the engaging mechanism F1 is set in the one-way rotation permission state. The engine brake is switched between the enabled state and a disabled state by engaging or releasing the brake B3. In FIG. 2A, "○" of the brake B3 in the first range (1st) indicates this.

An algorithm to determine which state is set for the engaging mechanism F1 in the first range (1st) can appropriately be designed. In this embodiment, the state before a change to the first range (1st) is inherited. For example, when changed from the reverse range (RVS) to the first range (1st), the engaging mechanism F1 remains in the rotation inhibition state in the first range (1st). However, if, for example, the vehicle speed exceeds a predetermined speed, the engaging mechanism F1 is switched to the one-way rotation permission state. Similarly, when changed from other forward ranges (2nd to 10th) to the first range (1st), the engaging mechanism F1 remains in the one-way rotation permission state in the first range (1st).

In the non-running ranges (P/N) as well, the state of the engaging mechanism F1 can be either the rotation inhibition state or the one-way rotation permission state. In this embodiment, the state before a change to the non-running ranges (P/N) is inherited, as in the first range (1st). In the second range (2nd) to the 10th range (10th), the engaging mechanism F1 is set in the one-way rotation permission state, but slips because of the structure of the automatic transmission 1. For this reason, the state of the engaging mechanism F1 is indicated by "(Δ)".

Figure 3:
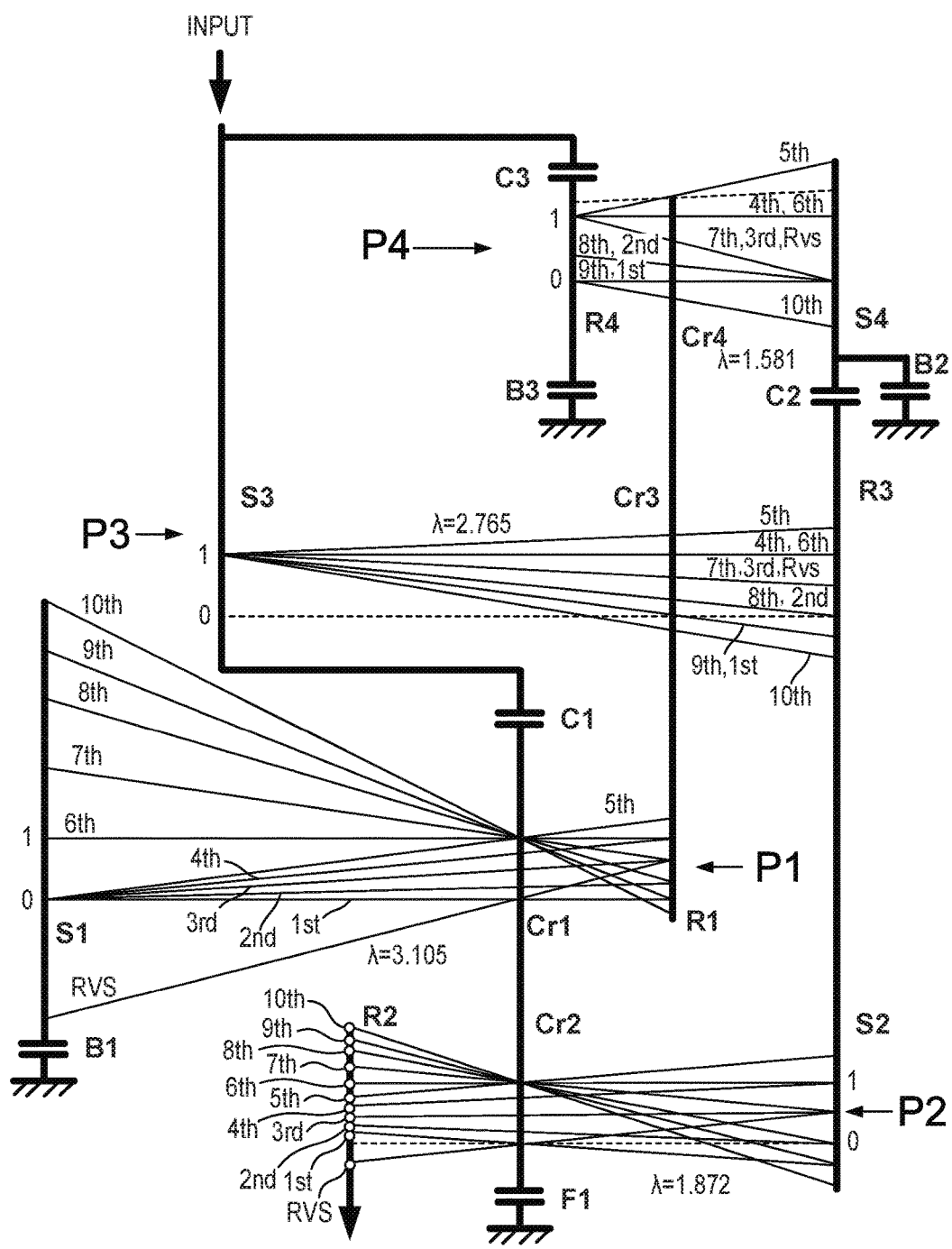
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
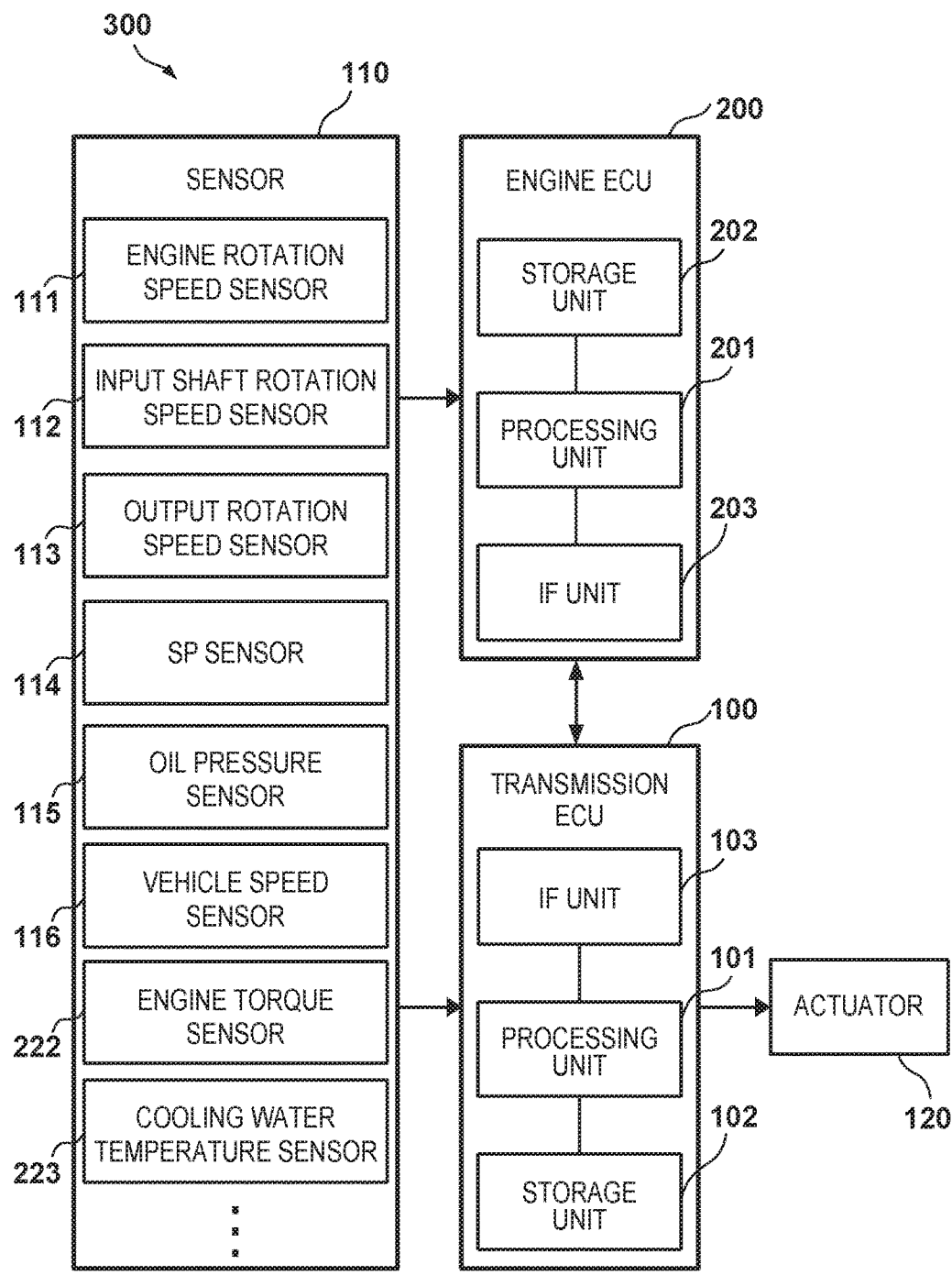
FIG. 4A is a block diagram showing an example of a control apparatus for the automatic transmission shown in FIG. 1.

FIGS. 4A and 4B are block diagrams showing the arrangement of a control apparatus 300. The control apparatus 300 includes a transmission ECU 100 and an engine ECU 200 and controls the internal combustion engine EG and the automatic transmission 1. The engine ECU 200 can control the internal combustion engine EG including the plurality of cylinders. The transmission ECU 100 can control the automatic transmission 1 including the torque converter TC with a lock-up clutch LC capable of connecting an output shaft 2 (engine output shaft) of the internal combustion engine EG and the input shaft 10 of the automatic transmission 1. The transmission ECU 100 can receive various kinds of information of the internal combustion engine EG and the vehicle from the engine ECU 200. The transmission ECU 100 can also transmit the information of the automatic transmission 1 to the engine ECU 200.

The engine ECU 200 includes a processing unit 201 such as a CPU, a storage unit 202 (engine storage unit) such as a RAM and ROM, and an IF unit 203 that functions as a connecting unit configured to perform communication between an external device or the transmission ECU 100 and the processing unit 201. The IF unit 203 is formed from, for example, a communication interface or an input/output interface. The processing unit 201 of the engine ECU 200 executes a program stored in the storage unit 202 (engine storage unit), determines the operation state of the internal combustion engine EG based on the detection results of various kinds of sensors 110, and controls the internal combustion engine EG. The processing unit 201 of the engine ECU 200 can perform cylinder deactivation control of decreasing the number of operating cylinders of the plurality of cylinders based on the operation state of the internal combustion engine EG (multiple cylinder engine).

The rotation output of the internal combustion engine EG is output to an engine output shaft 2. The rotation of the engine output shaft 2 is transmitted to the input shaft 10 of the automatic transmission 1 via the torque converter TC. The torque converter TC transmits the rotation torque of the engine output shaft 2 to the input shaft 10 of the automatic transmission 1 via a fluid (hydraulic oil).

The lock-up clutch LC performs lock-up control to connect a pump impeller 33 and a turbine wheel 32 by oil pressure control based on an instruction from the transmission ECU 100. In the open state of the lock-up clutch LC, that is, in a state in which the pump impeller 33 and the turbine wheel 32 are not connected, the relative rotation of the pump impeller 33 and the turbine wheel 32 is permitted. In this state, when the rotation torque of the engine output shaft 2 is transmitted to the pump impeller 33, the hydraulic oil filling the torque converter TC circulates from the pump impeller 33 to the turbine wheel 32 along with the rotation of the pump impeller 33. Accordingly, the rotation torque of the pump impeller 33 is transmitted to the turbine wheel 32 to drive the input shaft 10. On the other hand, in the engaging state of the lock-up clutch, the relative rotation of the pump impeller 33 and the turbine wheel 32 is restricted, and the rotation torque of the engine output shaft 2 is directly transmitted to the input shaft 10 of the automatic transmission 1.

The transmission ECU 100 includes a processing unit 101 such as a CPU, a storage unit 102 (transmission storage unit) such as a RAM and ROM, and an IF unit 103 that functions as a connecting unit configured to perform communication between an external device or engine ECU and the processing unit 101. The IF unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors. An engine rotation speed sensor 111 is a sensor that detects a rotation speed input from the internal combustion engine EG to the torque converter TC, that is, the rotation speed of the output shaft 2 (engine output shaft) of the internal combustion engine EG. An input shaft rotation speed sensor 112 is a sensor that detects the rotation speed of the input shaft 10. The slip ratio: ETR of the torque converter TC is calculated by ETR(%)=(rotation speed detected by input shaft rotation speed sensor 112)/(rotation speed detected by engine rotation speed sensor 111)×100

An output rotation speed sensor 113 is a sensor that detects the rotation speed of the output shaft 13.

An SP sensor (shift position sensor) 114 is a sensor that detects a shift position selected by the driver. In this embodiment, four types of shift positions, that is, P range (parking range), D range (forward range), N range (neutral range), and R range (reverse range) are assumed. If the D range is selected, the processing unit 101 can select one of the first range (1st) to the 10th range (10th) in accordance with a gear change map stored in the storage unit 102 (transmission storage unit) and change the gear. If the R range is selected, the processing unit 101 selects the reverse range.

An oil pressure sensor 115 includes a sensor that detects the oil pressure of hydraulic oil in each of the engaging mechanisms C1 to C3 and B1 to B3. A vehicle speed sensor 116 detects the running speed of the vehicle on which the automatic transmission 1 is mounted.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

FIG. 4B shows an example of the arrangement of the oil pressure sensor 115. The oil pressure sensor 115 can be provided for, for example, each of the engaging mechanisms C1 to C3 and B1 to B3. The oil pressure of hydraulic oil in each engaging mechanism can thus be detected. Note that the oil pressure sensor 115 need not always be provided for each engaging mechanism.

A solenoid valve LS for supplying hydraulic oil is assigned to each engaging mechanism. A supply line L of hydraulic oil is opened or closed by the solenoid valve LS, thereby switching the engaging and release states of each engaging mechanism. The oil pressure sensor 115 is provided so as to receive the hydraulic oil supplied from the solenoid valve LS to the engaging mechanism. The detection result of the oil pressure sensor 115 represents the oil pressure of the hydraulic oil supplied to the engaging mechanism. An oil pump 117 driven by the internal combustion engine EG forces the hydraulic oil into the supply line L.

<Switching Control of Engaging Mechanism F1>

In this embodiment, the engaging mechanism F1 is in the rotation inhibition state in the reverse range. When switching from the forward range or non-running range to the reverse range, the engaging mechanism F1 is sometimes switched from the one-way rotation permission state to the rotation inhibition state. At this time, to reduce unusual noise or vibration, the difference between the rotation speed of the engaging mechanism F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 112 or the like that the rotation speed of the carrier Cr2 is 0. After that, the engaging mechanism F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The engaging mechanism F1 is assumed to be in the one-way rotation permission state. First, as indicated by step 1 in FIG. 5, the brakes B1 and B2 are controlled to the release state. When release of the brakes B1 and B2 is completed, the process advances to step 2. In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that in this embodiment, step 2 is performed next to step 1. However, step 1 and step 2 may be performed simultaneously. More specifically, while performing control to set the brakes B1 and B2 in the release state, control to engage the clutches C1 and C3 and the brake B3 may be performed. This can improve responsiveness when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input rotation speed sensor 111<predetermined value (for example, a value that can be regarded as 0). As for the completion of engagement of the clutch C1, for example, when the detection result of the oil pressure sensor 115 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the engaging mechanism F1 is switched from the one-way rotation permission state to the rotation inhibition state. Since the difference between the rotation speed of the engaging mechanism F1 on the side of the casing 12 and that on the side of the carrier Cr2 is 0, occurrence of unusual noise or vibration can be avoided. When switching of the engaging mechanism F1 is completed, the process advances to step 4. In step 4, the clutch C1 and the brake B3 are released, and the brake B2 engages. The combination for the reverse range thus holds (FIG. 2A).

In some cases, the processing of steps 2 and 3 is called RVS preparation processing, and the processing of step 4 is called RVS in-gear processing. In terms of control, when step 1 is completed, an RVS preparation mode is set. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning details of control shown in FIG. 5 will be described later with reference to FIGS. 6A and 6B.

Figure 6A:
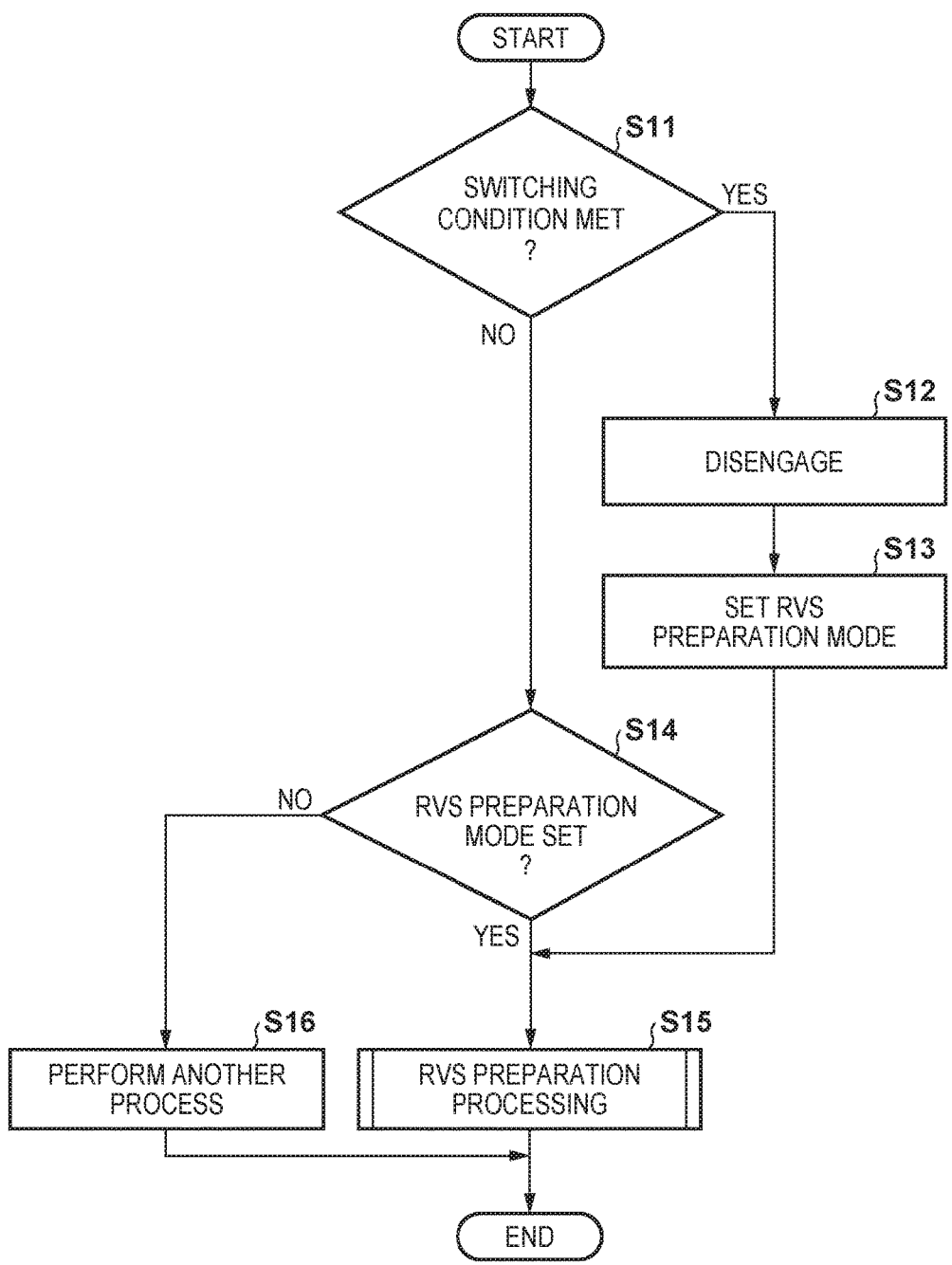
FIGS. 6A and 6B are flowcharts showing an example of processing of the control apparatus shown in FIGS. 4A and 4B.

FIG. 6A will be referred to. In step S11, it is determined whether a condition to switch the engaging mechanism F1 from the one-way rotation permission state to the rotation inhibition state is met. In this embodiment, if the engaging mechanism F1 is in the one-way rotation permission state, and the SP sensor 114 detects that the driver has switched the shift range from another range to the reverse range, it is determined that the condition is met. If YES in step S11, the process advances to step S12. Otherwise, the process advances to step S14.

In step S12, the engaging mechanisms (for example, the brakes B1 and B2) in the engaging state are released, as described concerning step 1 shown in FIG. 5. In step S13, the RVS preparation mode is set as the control mode. After that, the process advances to step S15.

In step S14, it is determined whether the RVS preparation mode is set. If YES in step S14, the process advances to step S15. Otherwise, the process advances to step S16. In step S15, RVS preparation processing is performed. Details will be described later. In step S16, another process is performed, and the processing of one unit ends.

Figure 6B:
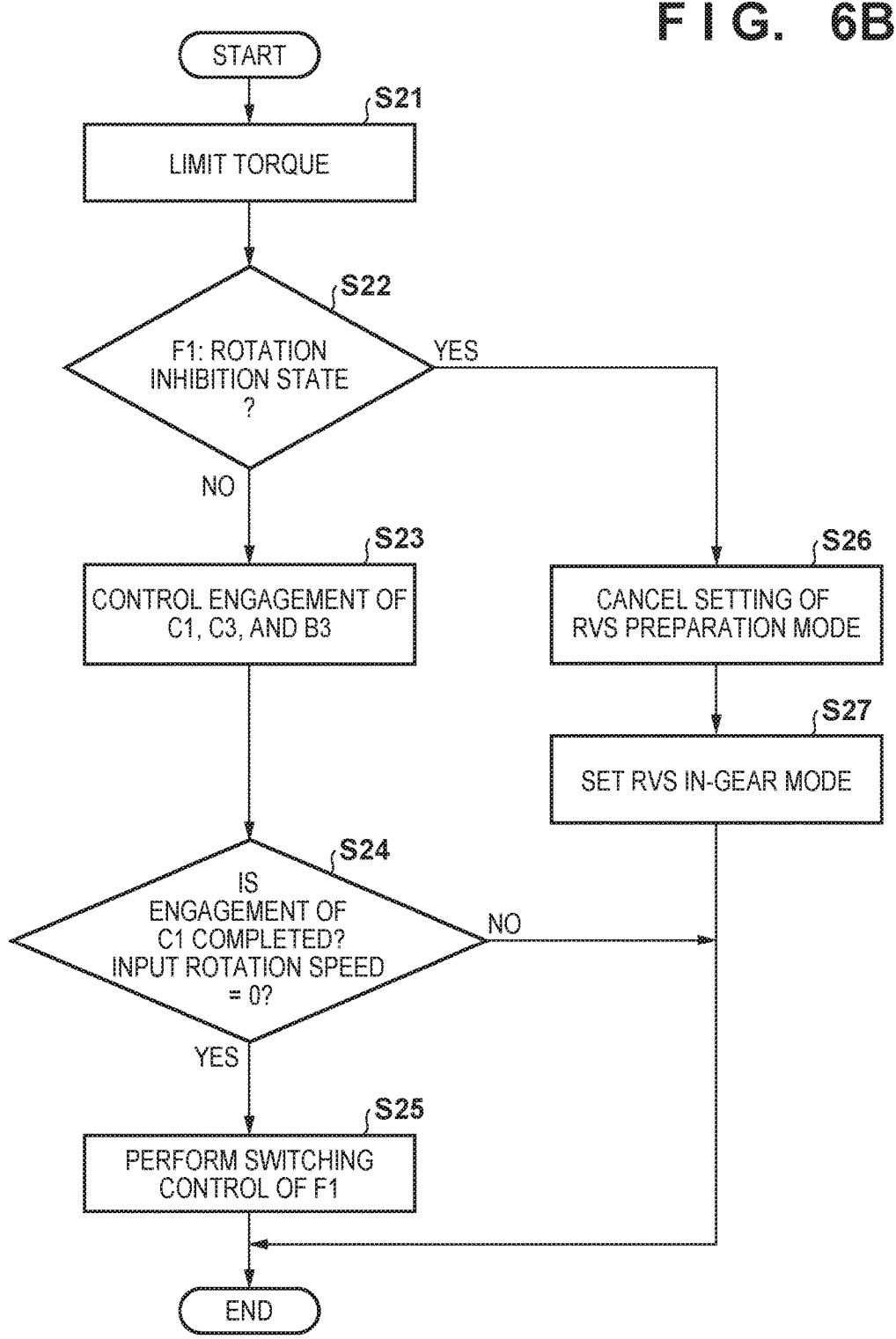

FIG. 6B will be referred to. FIG. 6B is a flowchart showing RVS preparation processing of step S15. In step S21, torque limitation of the driving source of the automatic transmission 1 is executed. For example, the output of the internal combustion engine EG is reduced within the range in which the necessary oil pressures of the engaging mechanisms and the like are ensured.

In step S22, it is determined whether switching of the engaging mechanism F1 to the rotation inhibition state is completed. If YES in step S22, the process advances to step S26. Otherwise, the process advances to step S23.

In step S23, control to engage the clutches C1 and C3 and the brake B3 starts, as described concerning step 2 shown in FIG. 5. The clutches C1 and C3 and the brake B3 can be engaged by increasing the control amounts to the solenoid valves LS of these engaging mechanisms stepwise. When the process of step S23 is repeated a plurality of times, the engagement is completed.

In step S24, it is determined whether engagement of the clutch C1 is completed, and the rotation speed of the input shaft 10 is 0, as described concerning step 2 shown in FIG. 5. If all the conditions are met, the process advances to step S25. If not all the conditions are met, the processing of one unit ends.

In step S25, the state of the engaging mechanism F1 is switched to the rotation inhibition state, as described concerning step 3 shown in FIG. 5. Since the switching is done in a state in which the difference between the rotation speed of the engaging mechanism F1 on the side of the casing 12 and that on the side of the carrier Cr2 is 0, it is possible to prevent occurrence of unusual noise or vibration and avoid breakage of the engaging mechanism F1.

In step S26, setting of the RVS preparation mode is canceled. In step S27, the RVS in-gear mode is set. With this setting, processing of releasing the clutch C1 and the brake B3 and engaging the brake B2 is performed, as described concerning step 4 shown in FIG. 5, in another routine (for example, step S16 in FIG. 6A). The processing thus ends.

<Cylinder Deactivation Control>

Figure 7:
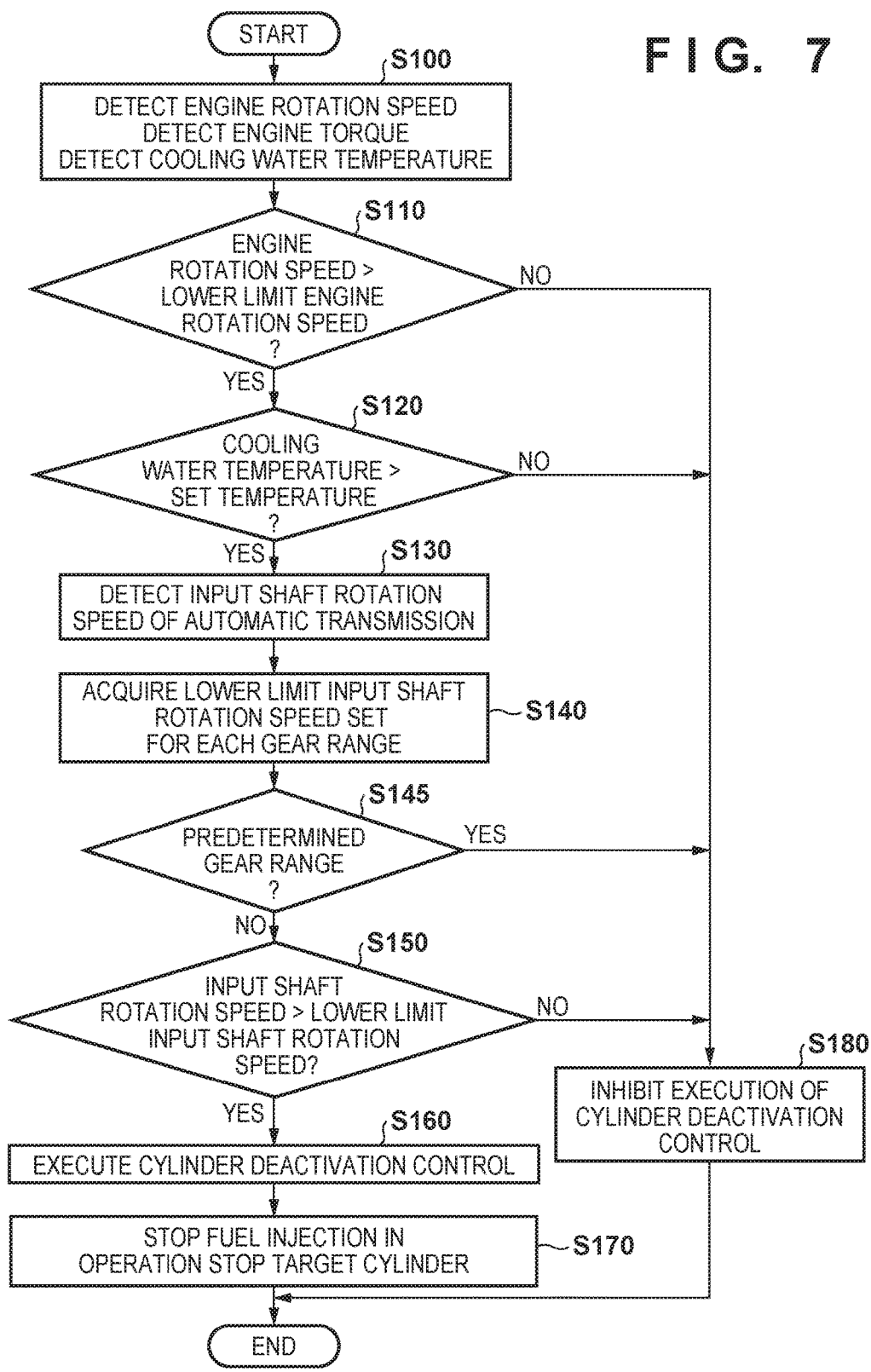
FIG. 7 is a flowchart for explaining the procedure of processing of determining whether cylinder deactivation is executable.

Cylinder deactivation control according to this embodiment will be described. FIG. 7 is a flowchart for explaining the procedure of processing of determining whether cylinder deactivation is executable.

In step S100, the engine rotation speed sensor 111 detects the rotation speed (engine rotation speed) of the internal combustion engine EG, an engine torque sensor 222 detects the torque of the internal combustion engine EG, and a cooling water temperature sensor 223 detects a cooling water temperature. The detection results obtained by the various kinds of sensors (111, 222, and 223) are input to the engine ECU 200.

In step S110, the processing unit 201 of the engine ECU 200 determines, based on the detection result of the engine rotation speed sensor 111, whether the rotation speed (engine rotation speed) of the output shaft of the internal combustion engine EG exceeds an engine rotation speed of a set lower limit (lower limit engine rotation speed). Upon determining in step S110 that the engine rotation speed detected by the engine rotation speed sensor 111 is equal to or lower than the lower limit engine rotation speed (NO in step S110), the processing unit 201 of the engine ECU 200 determines, concerning the engine rotation speed, that the operation state of the internal combustion engine EG is not an operation state that allows cylinder deactivation. The process advances to step S180, and the processing unit 201 of the engine ECU 200 does not execute cylinder deactivation control (step S180).

On the other hand, upon determining in step S110 that the engine rotation speed detected by the engine rotation speed sensor 111 exceeds the lower limit engine rotation speed (YES in step S110), the processing unit 201 of the engine ECU 200 determines, concerning the engine rotation speed, that the operation state of the internal combustion engine EG is the operation state that allows cylinder deactivation. The process advances to step S120.

In step S120, if the engine is in an engine cooling state in which the cooling water temperature is equal to or lower than a set temperature (NO in step S120), the engine ECU 200 determines that the internal combustion engine EG is not in a warming-up state after the engine start. In this case, the process advances to step S180, and the processing unit 201 of the engine ECU 200 does not execute cylinder deactivation control. On the other hand, if the cooling water temperature exceeds the set temperature based on the detection result of the cooling water temperature sensor 223 (YES in step S120), the processing unit 201 of the engine ECU 200 determines that the internal combustion engine EG is in the warming-up state, and advances the process to step S130. Note that if it is determined in step S110 that the engine rotation speed detected by the engine rotation speed sensor 111 exceeds the lower limit engine rotation speed (YES in step S110), the processing unit 201 of the engine ECU 200 may advance the process to step S130 without performing the determination in step S120.

Next, in step S130, the input shaft rotation speed sensor 112 detects the rotation speed of the input shaft 10 of the automatic transmission 1. The detection result of the input shaft rotation speed sensor 112 is input to the transmission ECU 100 of the automatic transmission 1.

In step S140, the processing unit 101 of the transmission ECU 100 acquires a lower limit input shaft rotation speed set for each gear range of the automatic transmission 1. Here, the lower limit input shaft rotation speed is a rotation speed set based on a change in NV (noise and vibration) performance, that is, vibration sound and vibration damping performance in a driving force transmission path corresponding to each gear range of the automatic transmission 1.

The driving force input from the torque converter TC to the input shaft 10 is transmitted to the output shaft 13 via a driving force transmission path formed for each gear range of the automatic transmission 1. In the driving force transmission path formed for each gear range, the inertia of the automatic transmission 1 can change in accordance with the operation states of the engaging mechanisms C1 to C3, B1 to B3, and F1. As the inertia becomes large, a damping force capable of damping a vibration sound and vibration from the internal combustion engine EG increases. When the plurality of engaging mechanisms (for example, C1 to C3, B1 to B3, and F1) of the automatic transmission 1 are switched to switch the driving force transmission path in the plurality of planetary gear mechanisms (for example, P1 to P4) and establish the plurality of gear ranges, the inertia changes in each gear range, and the damping force (damping performance) for damping the vibration sound and vibration also changes in each gear range.

The lower limit input shaft rotation speed set based on a change in the damping force (damping performance) of the automatic transmission 1 (for example, a change in the inertia or friction of the automatic transmission 1) in the driving force transmission path of each gear range and used to obtain a predetermined damping force (damping performance) for damping the vibration sound and vibration from the engine is set in a control map 121.

Figures 8, 9:
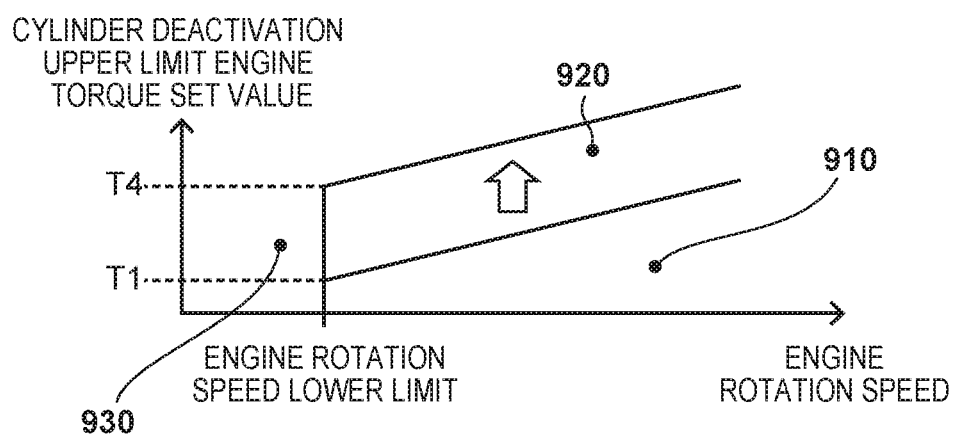
FIG. 8 is a view showing a control map.
FIG. 9 is a view exemplarily showing the relationship between an engine rotation speed and the set value of a cylinder deactivation upper limit engine torque.

FIG. 8 is a view showing the control map 121. For example, the storage unit 102 (transmission storage unit) stores the control map 121 that associates each gear range with the lower limit input shaft rotation speed of the main shaft (input shaft 10) of the automatic transmission 1 in each gear range. For example, NM5 is associated as the lower limit input shaft rotation speed in the fifth range (5th), and NM10 is associated as the lower limit input shaft rotation speed in the 10th range (10th). The processing unit 101 of the transmission ECU 100 refers to the control map 121 in the storage unit 102 (transmission storage unit) and acquires, from the control map 121, the lower limit input shaft rotation speed of the main shaft (input shaft 10) associated with the gear range selected in the automatic transmission 1.

The processing unit 101 of the transmission ECU 100 can select one of the first range (1st) to the 10th range (10th) in accordance with a gear change map stored in the storage unit 102 (transmission storage unit) and change the gear. The processing unit 101 acquires the lower limit input shaft rotation speed of the main shaft corresponding to the selected gear range from the control map 121.

In addition, the storage unit 102 (transmission storage unit) can store in advance the information of a predetermined gear range in which the damping force (damping performance) for damping the vibration sound and vibration is lower than a reference value in accordance with the operation states of the engaging mechanisms C1 to C3, B1 to B3, and F1 of the driving force transmission path formed for each gear range.

Note that the predetermined gear range is not limited to the information of one gear range, and pieces of information of a plurality of gear ranges can be stored in the storage unit 102. The processing unit 101 of the transmission ECU 100 can use the information of the predetermined gear range stored in the storage unit 102 for exceptional processing of cylinder deactivation control.

In step S145, the processing unit 101 of the transmission ECU 100 determines whether the selected gear range is the predetermined gear range of low damping performance. If the selected gear range is the predetermined gear range (YES in step S145), the process advances to step S180. If, of the plurality of gear ranges selectable in the automatic transmission 1, the information of the predetermined gear range in which the damping force is lower than the reference value is stored in the storage unit 102 (transmission storage unit), the transmission ECU 100 determines whether the gear range of the automatic transmission 1 is the predetermined gear range. If the transmission ECU 100 determines that the gear range of the automatic transmission is the predetermined gear range, the processing unit 201 of the engine ECU 200 inhibits execution of cylinder deactivation control. That is, the processing unit 201 of the engine ECU 200 does not execute cylinder deactivation control (step S180).

On the other hand, upon determining in step S145 that the selected gear range is not the predetermined gear range (NO in step S145), the processing unit 101 of the transmission ECU 100 advances the process to step S150. Note that if the information of the predetermined gear range of low damping performance is not set in the storage unit 102, the transmission ECU 100 advances the process to step S150 without performing the exceptional processing of step S145.

In step S150, the processing unit 101 of the transmission ECU 100 determines, based on comparison between the rotation speed of the input shaft detected by the input shaft rotation speed sensor 112 (rotation speed detection unit) and the lower limit input shaft rotation speed of the input shaft acquired from the control map 121, whether the rotation speed of the input shaft exceeds the lower limit input shaft rotation speed. Upon determining in step S150 that the rotation speed of the input shaft detected by the input shaft rotation speed sensor 112 (rotation speed detection unit) is equal to or lower than the lower limit input shaft rotation speed (NO in step S150), the process advances to step S180. Even if the engine rotation speed exceeds the lower limit engine rotation speed in the determination of step S110 described above, and concerning the engine rotation speed, the operation state of the internal combustion engine EG is the operation state that allows cylinder deactivation, if the actually detected rotation speed of the input shaft does not exceed the lower limit input shaft rotation speed, the processing unit 101 of the transmission ECU 100 determines that the operation state of the transmission 1 is not the operation state that allows cylinder deactivation, and the process advances to step S180.

The determination result (NO in step S150) of step S150 is transmitted from the transmission ECU 100 to the engine ECU 200. In step S180, the processing unit 201 of the engine ECU 200 determines, based on the determination result transmitted from the transmission ECU 100, that the operation state of the transmission 1 is not the operation state that allows cylinder deactivation. The processing unit 201 of the engine ECU 200 does not execute cylinder deactivation control (step S180).

On the other hand, upon determining in step S150 that the rotation speed of the input shaft exceeds the lower limit input shaft rotation speed (YES in step S150), the transmission ECU 100 determines that the operation state of the transmission 1 is the operation state that allows cylinder deactivation, and advances the process to step S160. In step S160, the determination result (YES in step S150) of step S150 is transmitted from the transmission ECU 100 to the engine ECU 200. Based on the determination result (engine rotation speed>lower limit engine rotation speed) of the engine rotation speed in step S110 and the determination result (input shaft rotation speed>lower limit input shaft rotation speed) of the input shaft rotation speed transmitted from the transmission ECU 100, the processing unit 201 of the engine ECU 200 sets an upper limit engine torque that permits cylinder deactivation. The processing unit 201 of the engine ECU 200 executes cylinder deactivation control according to this embodiment in the range of the set upper limit engine torque serving as the operation range that allows cylinder deactivation (step S160). If the rotation speed of the output shaft of the engine exceeds the lower limit engine rotation speed (YES in step S110), and the input shaft rotation speed exceeds the lower limit input shaft rotation speed (YES in step S150), the engine ECU 200 executes cylinder deactivation control of decreasing the number of operating cylinders by stopping the operations of some of the plurality of cylinders based on the cylinder deactivation upper limit engine torque set by referring to a cylinder deactivation control table (122 in FIG. 10) corresponding to the gear range of the automatic transmission.

The storage unit 202 (engine storage unit) of the engine ECU 200 stores, for each of the gear ranges (from the first range (1st) to the 10th range (10th)) of the automatic transmission 1, the cylinder deactivation control table that sets the cylinder deactivation upper limit engine torque determined based on the rotation speed of the output shaft of the engine and the rotation speed of the input shaft of the automatic transmission.

FIG. 10 is a view exemplarily showing the cylinder deactivation control table 122 that sets the upper limit engine torque (cylinder deactivation upper limit engine torque) determined based on the rotation speed (engine rotation speed: NE) of the output shaft of the engine and the rotation speed (input shaft rotation speed: NM) of the input shaft of the automatic transmission. The cylinder deactivation control table 122 is stored in the storage unit 202 (engine storage unit) of the engine ECU 200 in advance for each gear range. Referring to FIG. 10, the magnitude relation between the rotation speeds is N0<N1<N2<N3, and the magnitude relation between the cylinder deactivation upper limit engine torques is T1<T2<T3<T4<T5<T6. If the gear range of the automatic transmission 1, the engine rotation speed (NE), and the input shaft rotation speed (NM) are specified, the processing unit 201 of the engine ECU 200 can set the upper limit engine torque that permits cylinder deactivation by referring to the cylinder deactivation control table 122. For example, if the engine rotation speed (NE) is N2, and the input shaft rotation speed (NM) of the automatic transmission 1 is N1 in the cylinder deactivation control table 122, the processing unit 201 of the engine ECU 200 sets the upper limit engine torque T5 that permits cylinder deactivation by referring to the cylinder deactivation control table 122.

FIG. 11A is a view showing the set values of the upper limit engine torque that permits cylinder deactivation in correspondence with a predetermined input shaft rotation speed (NM=N0 in FIG. 10). The input shaft rotation speed (NM=N0) represents the lowest one of input shaft rotation speeds in the cylinder deactivation control table 122. The input shaft rotation speed changes depending on the state of the lock-up clutch LC. For this reason, for example, as the upper limit engine torque that permits cylinder deactivation in a case in which the determination result (input shaft rotation speed>lower limit input shaft rotation speed) of the input shaft rotation speed is not taken into consideration, the engine torque (T1, T2, T3) is set based on the lowest input shaft rotation speed (N0) and the engine rotation speed (NE: N1, N2, N3).

For example, when the input shaft rotation speed is NM=N0 (predetermined value), and the engine rotation speed (NE) is N1, the processing unit 201 of the engine ECU 200 sets the upper limit engine torque that permits cylinder deactivation to T1 (FIG. 11A). When the engine rotation speed (NE) is N2, the processing unit 201 of the engine ECU 200 sets the upper limit engine torque that permits cylinder deactivation to T2 (FIG. 11A). When the engine rotation speed (NE) is N3, the processing unit 201 of the engine ECU 200 sets the upper limit engine torque that permits cylinder deactivation to T3 (FIG. 11A).

FIG. 11B is a view showing the set values of the upper limit engine torque that permits cylinder deactivation in correspondence with an input shaft rotation speed (NM=N1, N2 in FIG. 10) higher than the lower limit input shaft rotation speed.

Referring to FIG. 10, when the engine rotation speed (NE) is N1, and the input shaft rotation speed (NM) is N1, the processing unit 201 of the engine ECU 200 sets the upper limit engine torque that permits cylinder deactivation to T4 (FIG. 11B). When the engine rotation speed (NE) is N2, and the input shaft rotation speed (NM) is N1 or N2, the processing unit 201 of the engine ECU 200 sets the upper limit engine torque that permits cylinder deactivation to T5 (FIG. 11B). When the engine rotation speed (NE) is N3, and the input shaft rotation speed (NM) is N1 or N2, the processing unit 201 of the engine ECU 200 sets the upper limit engine torque that permits cylinder deactivation to T6 (FIG. 11B).

FIG. 9 is a view exemplarily showing the relationship between the engine rotation speed and the set value of the cylinder deactivation upper limit engine torque. In FIG. 9, the abscissa represents the engine rotation speed, and the ordinate represents the set value of the cylinder deactivation upper limit engine torque. In FIG. 9, the region where the engine rotation speed is equal to or lower than the engine rotation speed lower limit (N1) is a cylinder deactivation NG region 930 where cylinder deactivation control is inhibited. In the cylinder deactivation NG region 930, the processing unit 201 of the engine ECU 200 does not execute cylinder deactivation control.

A cylinder deactivation permission region 910 is a region determined by an engine rotation speed higher than the engine rotation speed lower limit (N1) and a predetermined input shaft rotation speed (for example, NM=N0 in FIG. 10) in the cylinder deactivation control table 122. For example, when the engine rotation speed (NE) is N1, and the predetermined input shaft rotation speed (NM) is N0, the processing unit 201 of the engine ECU 200 sets the upper limit engine torque that permits cylinder deactivation to T1. The engine ECU 200 permits cylinder deactivation within the range where the engine torque does not exceed the set engine torque T1. As shown in FIG. 9, as the engine rotation speed increases, the set value of the cylinder deactivation upper limit engine torque in the cylinder deactivation permission region 910 also increases.

A cylinder deactivation permission addition region 920 is a region determined by an engine rotation speed higher than the engine rotation speed lower limit (N1) and an input shaft rotation speed (for example, NM=N1, N2, in FIG. 10) higher than the lower limit input shaft rotation speed in the cylinder deactivation control table 122. For example, when the engine rotation speed (NE) is N1, and the input shaft rotation speed (NM) is N1, the processing unit 201 of the engine ECU 200 sets the upper limit engine torque that permits cylinder deactivation to T4. The processing unit 201 of the engine ECU 200 permits cylinder deactivation within the range where the engine torque does not exceed the set engine torque T4. As shown in FIG. 9, as the engine rotation speed increases, the set value of the cylinder deactivation upper limit engine torque in the cylinder deactivation permission addition region 920 also increases.

As compared to cylinder deactivation control of permitting cylinder deactivation within the range of the cylinder deactivation permission region 910 in correspondence with a predetermined input shaft rotation speed, according to the cylinder deactivation control of this embodiment, the upper limit engine torque that permits cylinder deactivation is set in accordance with the engine rotation speed and the input shaft rotation speed higher than the lower limit input shaft rotation speed, thereby permitting cylinder deactivation in the cylinder deactivation permission addition region 920 wider than the cylinder deactivation permission region 910.

In step S170, by execution of cylinder deactivation control in step S160, the processing unit 201 of the engine ECU 200 stops fuel injection in the operation stop target cylinders so as to stop the operations of some of the plurality of cylinders and decrease the number of operating cylinders, and ends the processing.

<Summary of Embodiment>

Arrangement 1. A control apparatus (for example, 300) according to the embodiment is a control apparatus including an engine control unit (for example, 200) configured to control an engine including a plurality of cylinders, and a transmission control unit (for example, 100) configured to control an automatic transmission including a torque converter with a lock-up clutch capable of connecting an output shaft of the engine and an input shaft of the automatic transmission, wherein the engine control unit (for example, 200, 201) comprises:

an engine rotation speed determination unit (for example, S110) configured to determine, based on a detection result of an engine rotation speed detection unit configured to detect a rotation speed of the output shaft of the engine, whether the rotation speed of the output shaft of the engine exceeds a lower limit engine rotation speed; and an engine storage unit (for example, 202) configured to store, for each gear range of the automatic transmission, a cylinder deactivation control table (for example, 122) that sets a cylinder deactivation upper limit engine torque determined based on the rotation speed of the output shaft of the engine and a rotation speed of the input shaft of the automatic transmission, the transmission control unit (for example, 100, 101) comprises an input shaft rotation speed determination unit (for example, S150) configured to determine, based on a detection result of an input shaft rotation speed detection unit configured to detect the rotation speed of the input shaft of the automatic transmission, whether the rotation speed of the input shaft exceeds a lower limit input shaft rotation speed corresponding to a gear range of the automatic transmission, and if the rotation speed of the output shaft of the engine exceeds the lower limit engine rotation speed (for example, YES in S110), and the rotation speed of the input shaft exceeds the lower limit input shaft rotation speed (for example, YES in S150), the engine control unit (for example, 200, 201) executes cylinder deactivation control of decreasing the number of operating cylinders by stopping operations of some of the plurality of cylinders based on the cylinder deactivation upper limit engine torque set by referring to the cylinder deactivation control table (for example, 122) corresponding to the gear range of the automatic transmission (for example, S160).

According to the embodiment of arrangement 1, it is possible to determine, based on the condition of the rotation speed (engine rotation speed) of the output shaft of the internal combustion engine and the condition of the rotation speed of the input shaft of the automatic transmission, whether cylinder deactivation is executable and perform cylinder deactivation control. A range that cannot be permitted in the conventional cylinder deactivation control determination can be permitted in the cylinder deactivation control determination according to the embodiment of arrangement 1. It is therefore possible to further improve the fuel consumption of the engine.

Arrangement 2. The transmission control unit further comprises a transmission storage unit (for example, 102) configured to store a control map (for example, 121) that associates each gear range of the automatic transmission with the lower limit input shaft rotation speed of the input shaft in each gear range, and the input shaft rotation speed determination unit acquires, from the control map, the lower limit input shaft rotation speed of the input shaft associated with the gear range selected in the automatic transmission, and performs the determination based on comparison between the detected rotation speed of the input shaft and the lower limit input shaft rotation speed of the input shaft acquired from the control map (for example, S150).

Arrangement 3. The lower limit input shaft rotation speed is a rotation speed set based on a change (for example, a change in the inertia or friction of the automatic transmission 1) in a damping force (damping performance) of the automatic transmission in a driving force transmission path corresponding to each gear range of the automatic transmission and used to obtain a predetermined damping force for damping a vibration sound and vibration from the engine.

According to the embodiment of arrangements 2 and 3, the lower limit input shaft rotation speed serving as the reference of rotation of the input shaft (main shaft) of the automatic transmission is set for each gear range, thereby determining, based on the selected gear range of the automatic transmission, whether cylinder deactivation is executable.

Arrangement 4. The transmission storage unit (for example, 102) further stores, of a plurality of gear ranges selectable in the automatic transmission, information of a predetermined gear range in which the damping force is lower than a reference value, the transmission control unit (for example, 100, 101) determines whether the gear range of the automatic transmission is the predetermined gear range (for example, S145), and if the transmission control unit determines that the gear range of the automatic transmission is the predetermined gear range, the engine control unit (for example, 200, 201) inhibits execution of the cylinder deactivation control (for example, YES in S145, S180).

According to arrangement 4, cylinder deactivation control as exceptional processing can be inhibited for a predetermined gear range in which the damping force (damping performance) is lower than a reference value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus including an engine control unit configured to control an engine including a plurality of cylinders, and a transmission control unit configured to control an automatic transmission including a torque converter with a lock-up clutch capable of connecting an output shaft of the engine and an input shaft of the automatic transmission, wherein the engine control unit comprises:

an engine rotation speed determination unit configured to determine, based on a detection result of an engine rotation speed detection unit configured to detect a rotation speed of the output shaft of the engine, whether the rotation speed of the output shaft of the engine exceeds a lower limit engine rotation speed; and an engine storage unit configured to store, for each gear range of the automatic transmission, a cylinder deactivation control table that sets a cylinder deactivation upper limit engine torque determined based on the rotation speed of the output shaft of the engine and a rotation speed of the input shaft of the automatic transmission, the transmission control unit comprises an input shaft rotation speed determination unit configured to determine, based on a detection result of an input shaft rotation speed detection unit configured to detect the rotation speed of the input shaft of the automatic transmission, whether the rotation speed of the input shaft exceeds a lower limit input shaft rotation speed corresponding to a gear range of the automatic transmission, and if the rotation speed of the output shaft of the engine exceeds the lower limit engine rotation speed, and the rotation speed of the input shaft exceeds the lower limit input shaft rotation speed, the engine control unit executes cylinder deactivation control of decreasing the number of operating cylinders by stopping operations of some of the plurality of cylinders based on the cylinder deactivation upper limit engine torque set by referring to the cylinder deactivation control table corresponding to the gear range of the automatic transmission.

2. The apparatus according to claim 1, wherein the transmission control unit further comprises a transmission storage unit configured to store a control map that associates each gear range of the automatic transmission with the lower limit input shaft rotation speed of the input shaft in each gear range, and the input shaft rotation speed determination unit acquires, from the control map, the lower limit input shaft rotation speed of the input shaft associated with the gear range selected in the automatic transmission, and performs the determination based on comparison between the detected rotation speed of the input shaft and the lower limit input shaft rotation speed of the input shaft acquired from the control map.

3. The apparatus according to claim 2, wherein the lower limit input shaft rotation speed is a rotation speed set based on a change in a damping force of the automatic transmission in a driving force transmission path corresponding to each gear range of the automatic transmission and used to obtain a predetermined damping force for damping a vibration sound and vibration from the engine.

4. The apparatus according to claim 3, wherein the transmission storage unit further stores, of a plurality of gear ranges selectable in the automatic transmission, information of a predetermined gear range in which the damping force is lower than a reference value, the transmission control unit determines whether the gear range of the automatic transmission is the predetermined gear range, and if the transmission control unit determines that the gear range of the automatic transmission is the predetermined gear range, the engine control unit inhibits execution of the cylinder deactivation control.

* * * * *